United States Patent
Ohtomo et al.

(10) Patent No.: US 10,400,069 B2
(45) Date of Patent: Sep. 3, 2019

(54) AROMATIC POLYSULFONE

(71) Applicant: SUMITOMO CHEMICAL COMPANY, LIMITED, Tokyo (JP)

(72) Inventors: Shinji Ohtomo, Tsukuba (JP); Masanobu Matsubara, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 52 days.

(21) Appl. No.: 15/556,703

(22) PCT Filed: Mar. 15, 2016

(86) PCT No.: PCT/JP2016/058120
§ 371 (c)(1),
(2) Date: Sep. 8, 2017

(87) PCT Pub. No.: WO2016/148133
PCT Pub. Date: Sep. 22, 2016

(65) Prior Publication Data
US 2018/0057636 A1 Mar. 1, 2018

(30) Foreign Application Priority Data
Mar. 17, 2015 (JP) .................................. 2015-053107

(51) Int. Cl.
*C08G 75/205* (2016.01)
*C08G 65/40* (2006.01)
(Continued)

(52) U.S. Cl.
CPC ........... *C08G 75/205* (2013.01); *C08G 65/40* (2013.01); *C08G 75/23* (2013.01); *G01N 2030/486* (2013.01)

(58) Field of Classification Search
CPC ....... C08J 2381/06; C08J 5/18; C08G 75/205; C08G 75/23; C08G 65/40; G01N 2030/486; C08L 81/06
See application file for complete search history.

(56) References Cited

U.S. PATENT DOCUMENTS 6,437,080 B1 * 8/2002 McGrail ............ C08G 65/4093
528/171
9,587,112 B2    3/2017 Kohinata et al.
(Continued)

FOREIGN PATENT DOCUMENTS

CN    1040788 A    3/1990
JP    5-117527 A    5/1993
(Continued)

OTHER PUBLICATIONS

International Search Report for PCT/JP2016/058120 dated Jun. 14, 2016 [PCT/ISA/210].
(Continued)

*Primary Examiner* — Shane Fang
(74) *Attorney, Agent, or Firm* — Sughrue Mion, PLLC

(57) ABSTRACT

An aromatic polysulfone produced by polymerizing a dihalogeno compound represented by general formula (A) shown below, and a dihydric phenol represented by general formula (B) shown below, the aromatic polysulfone having a value (Mw/Mn) for the ratio between the weight average molecular weight (Mw) and the number average molecular weight (Mn) of less than 1.8, and having a number average molecular weight (Mn) of at least 6,000 but less than 14,000.
(Continued)

[Chemical formula 1]

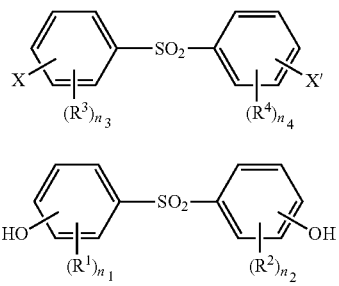

(In the formula, each of X and X' independently represents a halogen atom; each of $R^1$, $R^2$, $R^3$ and $R^4$ independently represents an alkyl group having a carbon number of 1 to 4 or an alkoxy group having a carbon number of 1 to 4; each of $n_1$, $n_2$, $n_3$ and $n_4$ independently represents an integer of 0 to 4; and when $n_1$, $n_2$, $n_3$ or $n_4$ is an integer of 2 to 4, the plurality of $R^1$, $R^2$, $R^3$ or $R^4$ groups may be the same as, or different from, each other).

6 Claims, 1 Drawing Sheet

(51) Int. Cl.
*C08G 75/23* (2006.01)
*G01N 30/00* (2006.01)

(56) References Cited

U.S. PATENT DOCUMENTS

2012/0190764 A1 7/2012 Kohinata et al.
2017/0022322 A1* 1/2017 Louis .................... C08G 65/00

FOREIGN PATENT DOCUMENTS

| JP | 10-338745 A | 12/1998 |
| JP | 2002-172675 A | 6/2002 |
| JP | 2010-77185 A | 4/2010 |
| JP | 2012-67216 A | 4/2012 |
| JP | 2013-253211 A | 12/2013 |
| JP | 5703645 B2 | 4/2015 |

OTHER PUBLICATIONS

Broadbelt, Linda., et al., "Influence of Poly(arylether sulfone) Molecular Weight Distribution on Measures of Global Thermal Stability", Journal of Applied Polymer Science, vol. 58, pp. 1325-1333, 1995.

First Office Action dated Feb. 27, 2019 from the China National Intellectual Property Administration in application No. 201680015552.7.

Broadbelt, Linda., et al., "Influence of Poly(arylether sulfone) Molecular Weight Distribution on Measures of Global Thermal Stability", Journal of Applied Polymer Science, vol. 58, pp. 1325-1334, 1995.

* cited by examiner

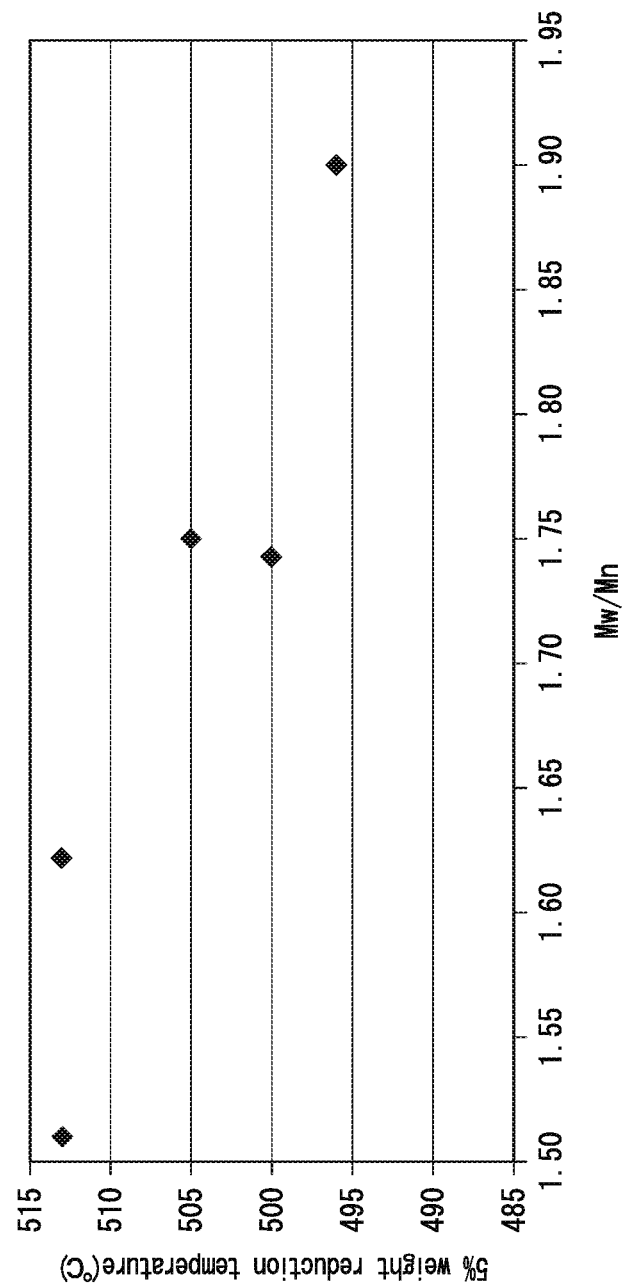

AROMATIC POLYSULFONE

CROSS REFERENCE TO RELATED APPLICATIONS

This application is a National Stage of International Application No. PCT/JP2016/058120, filed on Mar. 15, 2016, which claims priority from Japanese Patent Application No. 2015-053107, filed on Mar. 17, 2015, the contents of all of which are incorporated herein by reference in their entirety.

TECHNICAL FIELD

The present invention relate to an aromatic polysulfone.
Priority is claimed on Japanese Patent Application No. 2015-53107, filed Mar. 17, 2015, the content of which is incorporated herein by reference.

BACKGROUND ART

Aromatic polysulfones not only exhibit excellent levels of heat resistance, chemical resistance, and creep resistance and the like, but also display good adhesiveness to materials such as metals, glass and ceramics, and are therefore used as all manner of coating materials. One known example of this type of use is a method for forming a fluororesin coating film on a substrate surface by applying an aromatic polysulfone solution containing the fluororesin to a metal substrate and then conducting a heat treatment.

In order to ensure that the aromatic polysulfone has a level of heat resistance suitable for this type of application, it is important that the molecular weight and the molecular weight distribution of the aromatic polysulfone fall within appropriate ranges, and for example, an aromatic polysulfone having a number average molecular weight (Mn) of 11,000 to 25,000 and a polydispersity (Mw/Mn) of not more than 3.0 is already see Patent Document 1).

PRIOR ART LITERATURE

Patent Documents

Patent Document 1: JP 2002-172675 A

DISCLOSURE OF INVENTION

Problems to be Solved by the Invention

However, assuming molded articles formed using aromatic polysulfones, the heat resistance is not necessarily totally satisfactory, and further improvements in the heat resistance would be desirable.

The present invention has been developed in light of these circumstances, and has an object of providing a novel aromatic polysulfone which, as an indicator of heat resistance, has a high 5% weight reduction temperature.

Means for Solving the Problems

In order to achieve the above object, the present invention includes the following aspects.

The invention provides an aromatic polysulfone produced by polymerizing a dihalogeno compound represented by general formula (A) shown below, and a dihydric phenol represented by general formula (B) shown below, the aromatic polysulfone having a value (Mw/Mn) for the ratio between the weight average molecular weight (Mw) and the number average molecular weight (Mn) of less than 1.8, and also having a number average molecular weight (Mn) of at least 6,000 but less than 14,000.

[Chemical formula 1]

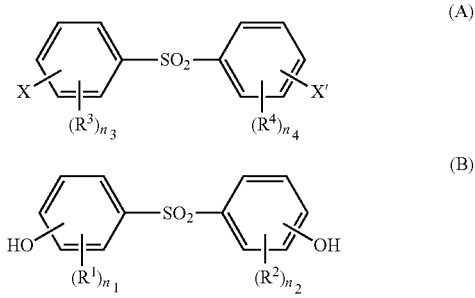

(In the formula, each of X and X' independently represents a halogen atom; each of $R^1$, $R^2$, $R^3$ and $R^4$ independently represents an alkyl group having a carbon number of 1 to 4 or an alkoxy group having a carbon number of 1 to 4; each of $n_1$, $n_2$, $n_3$ and $n_4$ independently represents an integer of 0 to 4; and when $n_1$, $n_2$, $n_3$ or $n_4$ is an integer of 2 to 4, the plurality of $R^1$, $R^2$, $R^3$ or $R^4$ groups may be the same as, or different from, each other.)

Effects of the Invention

By using the present invention, a novel aromatic polysulfone having a high 5% weight reduction temperature can be provided.

BRIEF DESCRIPTION OF THE DRAWINGS

The FIGURE is a graph illustrating the relationship between the polydispersity (Mw/Mn) and the 5% weight reduction temperature for aromatic polysulfones of the examples and comparative examples.

AROMATIC POLYSULFONE

The aromatic polysulfone of the present invention is a thermoplastic aromatic polysulfone obtained by polymerizing a dihalogeno compound represented by general formula (A) shown below (hereinafter sometimes referred to as simply "the dihalogeno compound (A)"), and a dihydric phenol represented by general formula (B) shown below (hereinafter sometimes referred to as simply "the dihydric phenol (B)"), the aromatic polysulfone having a value (Mw/Mn, namely the polydispersity) for the ratio between the weight average molecular Mw and the number average molecular weight Mn of less than 1.8, and also having a number average molecular weight Mn of at least 6,000 but less than 14,000.

Another aspect of the aromatic polysulfone of the present invention is a thermoplastic aromatic polysulfone in which the dihalogeno compound (A) represented by general formula (A) shown below and the dihydric phenol (B) represented by general formula (B) shown below are polymerized, the value of Mw/Mn that represents the ratio between the weight average molecular weight Mw and the number average molecular weight Mn is less than 1.8, and more preferably at least 1 but less than 1.8, and the number average molecular weight Mn is at least 6,000 but less than 4,000. In the present invention, by employing an aromatic polysulfone having a number average molecular weight within the above range, the heat resistance is improved despite the low number average molecular weight. It is thought that this is because when the number average molecular weight satisfies the above range, the amount of low-molecular weight components in the aromatic polysulfone is reduced, resulting in a narrower molecular weight distribution.

Yet another aspect of the aromatic polysulfone of the present invention is a thermoplastic aromatic polysulfone in which a structural unit derived from the dihalogeno compound (A) represented by general formula (A) shown below and a structural unit derived from the dihydric phenol (B) represented by general formula (B) shown below are polymerized, the value of Mw/Mn that represents the ratio between the weight average molecular weight Mw and the number average molecular weight Mn is less than 1.8, and more preferably at least 1 but less than 1.8, and the number average molecular weight Mn is at least 6,000 but less than 14,000.

Here, "derived from" means a change in the chemical structure due to the polymerization of the dihalogeno compound (A) and the dihydric phenol (B).

By using the dihalogeno compound (A) and the dihydric phenol (B) as monomers, and ensuring that the values of Mw/Mn and Mn satisfy the conditions described above, the aromatic polysulfone of the present invention is able to exhibit excellent heat resistance.

[Chemical formula 2]

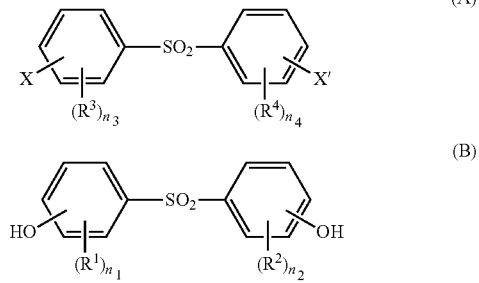

(In the formula, each of X and X' independently represents a halogen atom; each of $R^1$, $R^2$, $R^3$ and $R^4$ independently represents an alkyl group having a carbon number of 1 to 4 or an alkoxy group having a carbon number of 1 to 4; each of $n_1$, $n_2$, $n_3$ and $n_4$ independently represents an integer of 0 to 4; and when $n_1$, $n_2$, $n_3$ or $n_4$ is an integer of 2 to 4, the plurality of $R^1$, $R^2$, $R^3$ or $R^4$ groups may be the same as, or different from, each other.)

[Dihalogeno Compound (A)]

The dihalogeno compound (A) is a compound represented by general formula (A) above.

In formula (A), each of X and X' independently represents a halogen atom. Examples of the halogen atom include a chlorine atom, a bromine atom and an iodine atom, but a chlorine atom is preferable.

If the position number of the carbon atom of each benzene ring skeleton to which the sulfonyl group (—$SO_2$—) is bonded is deemed position 1, then X and X' may each be bonded to the carbon atom at any of position 2, position 3 and position 4 of the benzene skeleton, but is preferably bonded to the carbon atom of position 4. In other words, the dihalogeno compound (A) is preferably a bis(4-chlorophenyl)sulfone to which either one or both of $R^3$ and may be bonded instead of a hydrogen atom.

In the formula, each of $R^3$ and $R^4$ independently represents an alkyl group having a carbon number of 1 to 4 or an alkoxy group having a carbon number of 1 to 4.

The alkyl group for $R^3$ or $R^4$ may be linear, branched or cyclic, but is preferably linear or branched. Specific examples include a methyl group, ethyl group, n-propyl group, isopropyl group, n-butyl group, isobutyl group, sec-butyl group and tert-butyl group, and of these, a methyl group is preferable.

The alkoxy group for $R^3$ or $R^4$ may be linear, branched or cyclic, but is preferably linear or branched. Specific examples include a methoxy group, ethoxy group, n-propoxy group, isopropoxy group, n-butoxy group, isobutoxy group, sec-butoxy group and tert-butoxy group, and of these, a methoxy group is preferable.

In the formula, $n_3$ represents the number of bonded $R^3$ groups and $n_4$ represents the number of bonded $R^4$ groups, and each independently represents an integer of 0 to 4.

When $n_3$ or $n_4$ is a number besides 0, there are no particular limitations on the bonding position of each corresponding $R^3$ or $R^4$ group, and if the position number of the carbon atom of the benzene ring skeleton to which the sulfonyl group is bonded is deemed position 1, then each corresponding $R^3$ or $R^4$ group may be bonded to the carbon atom at any of position 2, position 3, position 4, position 5 and position 6 of the benzene skeleton (but excluding the carbon atom to which X or X' is bonded). The bonding position mentioned above is preferably a carbon atom other than position 4, and is more preferably the carbon atom of position 3 or position 5, or the carbon atoms of position 3 and position 5.

When $n_3$ or $n_4$ is an integer from 2 to 4, the plurality of $R^3$ or $R^4$ groups may be the same as, or different from, each other. For example, when $n_3$ is an integer of 2 to 4, the $n_3$ $R^3$ groups may be all the same or all different, and when $n_3$ is 3 or 4, only a portion of the $R^3$ groups may be the same. The case of $n_4$ $R^4$ groups is the same as that described for $n_3$ $R^3$ groups.

Each of $n_3$ and $n_4$ is, independently, preferably an integer of 0 to 3, more preferably an integer of 0 to 2, and roost preferably 0 or 1.

An example of a preferred dihalogeno compound (A) is bis(4-chlorophenyl)sulfone (also known by the alternative name: 4,4'-dichlorodiphenylsulfone).

[Dihydric Phenol (B)]

The dihydric phenol (B) is a compound represented by general formula (B) shown above.

In the dihydric phenol (B the position number of the carbon atom of each benzene ring skeleton to which the sulfonyl group is bonded is deemed position 1, then the two hydroxyl groups (—OH) may each be bonded to the carbon atom at any of position 2, position 3 and position 4 of the benzene skeleton, but is preferably bonded to the carbon atom of position 4.

In formula (B), each of $R^1$ and $R^2$ independently represents an alkyl group having a carbon number of 1 to 4 or an alkoxy group having a carbon number of 1 to 4. Examples of the alkyl group having a carbon number of 1 to 4 or the alkoxy group having a carbon number of 1 to 4 for $R^1$ and $R^2$ include the same groups as those mentioned above in the description of $R^3$ and $R^4$.

Further, $n_1$ represents the number of bonded $R^1$ groups and $n_2$ represents the number of bonded $R^2$ groups, and each independently represents an integer of 0 to 4.

When $n_1$ or $n_2$ is a number besides 0, there are no particular limitations on the bonding position of each corresponding $R^1$ or $R^2$ group, and if the position number of the carbon atom of the benzene ring skeleton to which the sulfonyl group is bonded is deemed position 1, then each corresponding $R^1$ or $R^2$ group may be bonded to the carbon atom at any of position 2, position 3, position 4, position 5 and position 6 of the benzene skeleton (but excluding the carbon atom to which the hydroxyl group is bonded). The bonding position mentioned above is preferably a carbon atom other position 4, and is more preferably the carbon atom of position 3 or position 5, or the carbon atoms of position 3 and position 5.

When $n_1$ or $n_2$ is an integer from 2 to 4, the plurality of $R^1$ or $R^2$ groups may be the same as, or different from, each other. For example, when $n_1$ is an integer of 2 to 4, the $n_1$ $R^1$ groups may be all the same or all different, and when $n_1$ is 3 or 4, only a portion of the $R^1$ groups may be the same. The case of $n_2$ $R^2$ groups is the same as that described for $n_1$ $R^1$ groups.

Each of $n_1$ and $n_2$ is, independently, preferably an integer of 0 to 3, more preferably an integer of 0 to 2, and most preferably 0 or 1.

In another aspect, bis(4-hydroxyphenyl)sulfone (also known by the alternative name: 4,4'-dihydroxydiphenylsulfone) and bis(4-hydroxy-3,5-dimethylphenyl)sulfone are preferred as the dihydric phenol (B).

In other words, the aromatic polysulfone of the present invention preferably has a repeating unit represented by formula (C) shown below or formula (D) shown below.

[Chemical formula 3]

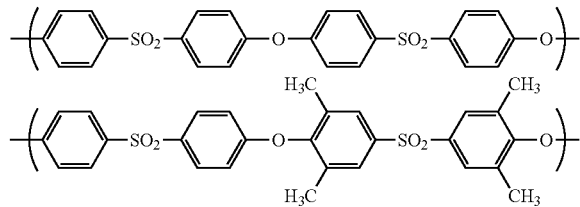

The reduced viscosity of the aromatic polysulfone of the present invention is preferably at least 0.18 dL/g but not more than 0.36 dL/g, and is more preferably within a range from 0.22 to 0.28 dL/g. The reduced viscosity preferably satisfies the above range from the viewpoints of melt viscosity and fluidity.

The higher the reduction viscosity of the aromatic polysulfone, the easier it is to improve the heat resistance and the strength and rigidity, but if the reduction viscosity is too high (namely, higher than the above upper limit), then the melting temperature and the melt viscosity are prone to becoming very high, and the fluidity tends to deteriorate. The reduction viscosity is the value measured at 25° C. using an Ostwald viscosity tube for an N,N-dimethylformamide solution having a resin concentration of 1.0 g/100 ml.

The number average molecular weight (Mn) of the aromatic polysulfone of the present invention is at least 6,000, preferably at least 6,500, more preferably at least 7,000, and even more preferably 7,500 or greater. Provided Mn is at least as large as the above lower limit, the aromatic polysulfone has remarkably superior heat resistance.

Further, the number average molecular weight (Mn) of the aromatic polysulfone of the present invention is less than 14,000, preferably not more than 13,500, more preferably not more than 13,000, even more preferably not more than 12,500, particularly preferably not more than 12,000, and most preferably 11,800 or less. Provided Mn is not more than the above upper limit, the aromatic polysulfone has remarkably superior heat resistance.

The various upper limits and lower limits mentioned above may be combined arbitrarily.

For example, the number average molecular weight (Mn) of the aromatic polysulfone of the present invention is at least 6,000 but less than 14,000, and is preferably within a range from 6,500 to 13,500, more preferably from 7,000 to 13,000, even more preferably from 7,000 to 12,500, even more preferably from 7,000 to 12,000, and particularly preferably from 7,500 to 11,800.

Further, in another aspect, Mn may be from 7,700 to 11,700.

Mw may be within a range from 11,600 to 20,300.

In the aromatic polysulfone of the present invention, the value of Mw/Mn (the polydispersity) is less than 1.8, preferably at least 1 but less than 1.8, more preferably at least 1 but not more than 1.79, even more preferably at least 1 but not more than 1.78, particularly preferably at least 1 but not more than 1.76, and most preferably at least 1 but not more than 1.63. Provided the value of Mw/Mn is not more than the above upper limit, the aromatic polysulfone has remarkably superior heat resistance.

In the aromatic polysulfone of the present invention, a value of Mw/Mn of, for example, 1.5 to 1.79 is particularly preferable.

In another aspect, the value of Mw/Mn may be from 1.51 to 1.75, or from 1.51 to 1.63.

The values of Mn and Mw in the present description are values obtained by averaging two values measured by gel permeation chromatography (GPC) analysis under the conditions described in the following example. Further, Mw/Mn is a value calculated from the averaged Mn and Mw values above.

The aromatic polysulfone of the present invention exhibits excellent heat resistance. For example, when a 10 mg sample of the aromatic polysulfone is combusted by raising the temperature to 800° C. at a rate of temperature increase of 10° C./minute, and the temperature at which the weight of the sample has reduced by 5% relative to the weight at 200° C., namely the "5% weight reduction temperature (° C.)", is determined from the obtained TGA curve (thermogravimetric curve), this 5% weight reduction temperature for the aromatic polysulfone of the present invention is preferably at least 498° C. but not more than 530° C., and more preferably at least 499° C. but not more than 530° C. Further, in another aspect, the 5% weight reduction temperature may be from 500 to 513.

The 5% weight reduction temperature acts as an indicator for judging the degree of heat resistance of the aromatic polysulfone, and it can usually be stated that the higher this temperature, the more superior the heat resistance of the aromatic polysulfone.

[Polymerization]

Polymerization (hereinafter sometimes referred to as polycondensation) of the dihalogeno compound (A) and the dihydric phenol (B) is preferably either performed using an alkali metal carbonate salt as a base, or performed in an organic solvent that acts as a polymerization solvent, and is more preferably performed using an alkali metal carbonate salt as a base, and in an organic solvent.

The alkali metal carbonate salt may be a true alkali carbonate (such as a carbonate salt of an alkali metal), an alkali bicarbonate (such as an alkali hydrogen carbonate or a hydrogen carbonate salt of an alkali metal) which is an acidic salt, or a mixture thereof (such as a mixture of an alkali carbonate and an alkali bicarbonate).

Examples of preferred alkali carbonates include sodium carbonate and potassium carbonate.

Examples of preferred alkali bicarbonates include sodium bicarbonate (also called sodium hydrogen carbonate) and potassium bicarbonate (also called potassium hydrogen carbonate).

The organic solvent mentioned above is preferably an organic polar solvent.

Examples of the organic polar solvent include dimethyl sulfoxide, 1-methyl-2-pyrrolidone, sulfolane (also called 1,1-dioxothiolane) 1,3-dimethyl-2-imidazolidinone, 1,3-diethyl-2-imidazolidinone, dimethyl sulfone, diethyl sulfone, diisopropyl sulfone and diphenyl sulfone. Among these, diphenyl sulfone is preferable.

The amount used of the dihalogeno compound in the polymerization is preferably from 90 to 105 mol, and more preferably from 93 to 100 mol, per 100 mol of the dihydric phenol (B). The targeted reaction (polymerization) is a dehydrohalogenation polycondensation of the dihalogeno compound (A) and the dihydric phenol (B), and if the assumption is made that no side-reactions occur, then the closer the molar ratio between the two reactants is to 1:1, namely the closer the amount used of the dihalogeno compound (A) and the amount used of the dihydric phenol (B) (number of moles) are to equal amounts, the higher the degree of polymerization of the obtained aromatic polysulfone becomes, which tends to result in an aromatic polysulfone having a higher reduction viscosity, a larger Mn value, and a smaller Mw/Mn value. However, in actuality, side reactions caused by by-product alkali hydroxide or the like, such as substitutions of halogen atoms with hydroxyl groups or depolymerization reactions, occur, and these side reactions cause a reduction in the degree of polymerization of the obtained aromatic polysulfone. Accordingly, the amount used of the dihalogeno compound (A) must be adjusted with due consideration of the level of these side reactions, so as to obtain an aromatic polysulfone having the prescribed reduction viscosity, Mn and Mw/Mn values.

The amount used of the alkali metal carbonate salt is preferably sufficient to provide 90 to 110 mol, and even more preferably 95 to 105 mol, of the alkali metal of the alkali metal carbonate salt, per 100 mol of hydroxyl groups in the dihydric phenol (B) the assumption is made that no side-reactions occur, then the larger the amount used of the alkali metal carbonate salt, the faster the targeted polycondensation proceeds, and therefore the larger the degree of polymerization of the obtained aromatic polysulfone becomes, which tends to result in an aromatic polysulfone having a higher reduction viscosity, a larger Mn value, and a smaller Mw/Mn value. However, in actuality, the larger the amount used of the alkali metal carbonate salt, the more readily the same side reactions as those mentioned above occur, and these side reactions cause a reduction in the degree of polymerization of the obtained aromatic polysulfone. Accordingly, the amount used of the alkali metal carbonate salt must be adjusted with due consideration of the level of these side reactions, so as to obtain an aromatic polysulfone having the prescribed reduction viscosity, Mn and Mw/Mn values.

In a typical method for producing the aromatic polysulfone, as a first step, the dihalogeno compound (A) and the dihydric phenol (B) are dissolved in an organic polar solvent, as a second step, an alkali metal carbonate salt is added to the solution obtained in the first step, and the dihalogeno compound (A) and the dihydric phenol (B) are subjected to a polycondensation, and as a third step, the aromatic polysulfone is obtained by removing unreacted alkali metal carbonate salt, by-product alkali halides, and the organic polar solvent from the reaction mixture obtained in the second step.

The dissolution temperature the first step is usually preferably from 40 to 180° C. Further, the polycondensation temperature in the second step is usually preferably from 180 to 400° C., and more preferably from 220 to 300° C. If the assumption is made that no side-reactions occur, then the higher the polycondensation temperature, the faster the targeted polycondensation proceeds, and therefore the larger the degree of polymerization of the obtained aromatic polysulfone becomes. As a result, the aromatic polysulfone tends to have a higher reduction viscosity, a larger Mn value, and a smaller Mw/Mn value. However, in actuality, the higher the polycondensation temperature, the more readily the same side reactions as those mentioned above occur, and these side reactions cause a reduction in the degree of polymerization of the obtained aromatic polysulfone. Accordingly, the polycondensation temperature must be adjusted with due consideration of the level of these side reactions, so as to obtain an aromatic polysulfone having the prescribed reduction viscosity, Mn and Mw/Mn values.

Further, in the solution obtained in the first step, the concentration of the dihalogeno compound (A) is typically from 10 to 40% by weight, and preferably from 20 to 30% by weight, relative to the total weight of the solution, and the concentration of the dihydric phenol (B) is typically from 10 to 40% by weight, and preferably from 20 to 30% by weight, relative to the total weight of the solution.

Further, the polycondensation of the second step is typically performed by gradually increasing the temperature, while removing the water generated as a by-product, until the reflux temperature of the organic polar solvent is reached, and then holding that temperature, preferably for 1 to 50 hours, and more preferably 2 to 30 hours. If the assumption is made that no side-reactions occur, then the longer the polycondensation time, the more the targeted polycondensation proceeds, and therefore the larger the degree of polymerization of the obtained aromatic polysulfone becomes. As a result, the aromatic polysulfone tends to have a higher reduction viscosity, a larger Mn value, and a smaller Mw/Mn value. However, in actuality, the longer the polycondensation e the more the same side reactions as those mentioned above proceed, and these side reactions cause a reduction in the degree of polymerization of the obtained aromatic polysulfone. Accordingly, the polycondensation time must be adjusted with due consideration of the level of these side reactions, so as to obtain an aromatic polysulfone having the prescribed reduction viscosity, Mn and Mw/Mn values.

In the third step, first, the unreacted alkali metal carbonate salt and the by-product alkali halides are removed from the reaction mixture obtained in the second step by filtration, extraction, or centrifugal separation or the like, thus obtaining a solution containing the aromatic polysulfone dissolved in the organic polar solvent. The concentration of the aromatic polysulfone in the solution is preferably from 30 to 60% by weight, relative to the total weight of the solution. Subsequently, the aromatic polysulfone can be obtained by removing the organic polar solvent from this solution. Removal of the organic polar solvent may be performed by distilling and removing the organic polar solvent directly from the solution, or by mixing the solution with a poor solvent for the aromatic polysulfone, thereby precipitating the aromatic polysulfone, and then separating the aromatic polysulfone by filtration or centrifugal separation or the like.

Examples of the poor solvent for the aromatic polysulfone include methanol, ethanol, 2-propanol, hexane, heptane and water, and methanol is preferable in terms of being easy to remove.

Furthermore, in those cases where an organic polar solvent having a comparatively high melting point is used as the polymerization solvent, the reaction mixture obtained in the second step may be cooled, solidified and then crushed, the unreacted alkali metal carbonate salt and by-product alkali halides may then be removed from the thus obtained powder by extraction with water, and the aromatic polysulfone may then be obtained by extracting and removing the organic polar solvent using a solvent that does not dissolve the aromatic polysulfone, but dissolves nixes uniformly with) the organic polar solvent.

In terms of extraction efficiency and extraction workability, the volume average particle size of the above powder is preferably from 200 to 2,000 μm, more preferably from 250 to 1,500 μm, and even more preferably from 300 to 1,000 μm. By ensuring that the volume average particle size of the powder is at least as large as the above lower limit, hardening during extraction, and the occurrence of blockages when performing filtering or drying following the extraction, can be suppressed to a large degree. Further, by ensuring that the volume average particle size of the powder is not more than the above upper limit, the extraction efficiency can be further enhanced.

The "volume average particle size" refers to a value measured by a laser diffraction method.

Examples of the aforementioned extraction solvent, for example in the case where diphenyl sulfone is used as the polymerization solvent, include mixed solvents of acetone and methanol. The mixing ratio between the acetone and methanol is usually determined from the viewpoints of extraction efficiency and the sticking tendency of the aromatic polysulfone powder, and for example, is preferably within a range from 44:56 to 60:40.

Further, in an alternative typical method for producing the aromatic polysulfone different form the method described above, as a first step, the dihydric phenol (B) and an alkali metal carbonate salt are reacted in an organic polar solvent and the by-product water moved, as a second step, the dihalogeno compound (A) is added to the reaction mixture obtained in the first step and a polycondensation is performed, and as a third step, in a similar manner to that described above, the aromatic polysulfone is obtained by removing unreacted alkali metal carbonate salt, by-product alkali halides, and the organic polar solvent from the reaction mixture obtained in the second step.

In this alternative method, in order to remove the by-product water in the first step, an organic solvent that undergoes azeotropic distillation with water may be added, and dewatering may then be performed by azeotropic distillation. Examples of organic solvents that undergo azeotropic distillation with water include benzene, chlorobenzene, toluene, methyl isobutyl ketone, hexane and cyclohexane, and of these, toluene is preferable. The temperature of the azeotropic distillation is preferably within a range from 70 to 200° C.

Further, in this alternative method, the reaction temperature during the polycondensation of the second step is preferably from 40 to 180° C., and the polycondensation time is preferably from 2 to 10 hours. In a similar manner to that described above, the polycondensation temperature and the polycondensation time must be adjusted with due consideration of the level of side reactions, so as to obtain an aromatic polysulfone having the prescribed reduction viscosity, Mn and Mw/Mn values.

In other words, one aspect of the method for producing an aromatic polysulfone includes:

a first step that includes dissolving the halogeno compound (A) and the dihydric phenol (B) in an organic polar solvent at a temperature of 40 to 180° C.;

a second step that includes adding an alkali metal carbonate salt to the solution obtained in the first step, and subjecting the dihalogeno compound (A) and the dihydric phenol (B) to a polycondensation at a temperature of 180 to 400° C.; and a third step that includes removing unreacted alkali metal carbonate salt, by-product alkali halides and the organic polar solvent from the reaction mixture obtained in the second step.

In the second step, the polycondensation is preferably performed at 220 to 300° C. Further, in the second step, the temperature is preferably held for 1 to 50 hours after reaching the reflux temperature of the polar organic solvent.

The third step may be a step that includes removing unreacted alkali metal carbonate salt and by-product alkali halides from the above reaction mixture, and then removing the organic polar solvent from the resulting solution. Further, the third step may also be a step that includes cooling, solidifying and then crushing the above reaction mixture, removing the unreacted alkali metal carbonate salt and by-product alkali halides from the thus obtained powder by extraction with water, and then extracting and removing the organic polar solvent using a solvent that does not dissolve the aromatic polysulfone, but dissolves (mixes uniformly with) the organic polar solvent.

Another aspect of the method for producing an aromatic polysulfone includes:

an alternative first step that includes reacting the dihydric phenol (B) and an alkali metal carbonate salt in an organic polar solvent, and removing the by-product water;

an alternative second step that includes adding the dihalogeno compound (A) to the reaction mixture obtained in the alternative first step and performing a polycondensation at 40 to 180° C.; and an alternative third step that includes removing unreacted alkali metal carbonate salt, by-product alkali halides, and the organic polar solvent from the reaction mixture obtained in the alternative second step.

Because the aromatic polysulfone of the present invention exhibits excellent heat resistance, the functionality of the aromatic polysulfone manifests satisfactorily even under extreme heating conditions. Further, the aromatic polysulfone also displays good adhesiveness to materials such as metals, glass and ceramics. Accordingly, the aromatic polysulfone of the present invention is ideal, for example, as a coating material for members formed from metals, glass or ceramics or the like. The coating on these types of members can be formed, for example, by preparing a resin composition (resin solution) containing the aromatic polysulfone and another resin, applying this resin composition to the targeted member, and then drying the composition to form a coating film of the resin on the surface of the member. However, this is merely one example, and applications of the aromatic polysulfone of the present invention are limited to this application. The aromatic polysulfone of the present invention is, for example, also ideal for use in fields such as automobiles and aircraft.

One aspect of the aromatic polysulfone of the present invention is a thermoplastic aromatic polysulfone wherein bis(4-chlorophenyl)sulfone, and at least one compound selected from the group consisting of bis(4-hydroxyphenyl) sulfone and bis(4-hydroxy-3,5-dimethylphenyl)sulfone are polymerized, the value of Mw/Mn that represents the ratio between the weight average molecular weight Mw and the number average molecular weight is from 1.5 to 1.79, and more preferably from 1.5 to 1.63, the number average molecular weight Mn is from 7,000 to 12,000, and the 5% weight reduction temperature is at least 498° C. but not more than 530° C.

Another aspect of the dihalogeno compound (A) of the present invention is a thermoplastic aromatic polysulfone wherein bis(4-chlorophenyl)sulfone, and at least one compound selected from the group consisting of bis(4-hydroxyphenyl) sulfone and bis(4-hydroxy-3,5-dimethylphenyl)sulfone are polymerized, the value of Mw/Mn that represents the ratio between the weight average molecular weight Mw and the number average molecular weight is from 1.5 to 1.79, and more preferably from 1.5 to 1.63, the number average molecular weight Mn is from 7,000 to 12,000, the reduction viscosity is at least 0.18 dL/g but not more than 0.36 dL/g, and the 5% weight reduction temperature is at least 498° C. but not more than 530° C.

EXAMPLES

The present invention is described below in further detail using specific examples, but the present invention is in no way limited by the following examples.

In these examples, evaluation of the aromatic polysulfones was performed by measuring physical properties using the following methods.

<Measurement of Aromatic Polysulfone Mn and Mw, Calculation of Mw/Mn>

Gel permeation chromatography (GPC) analyses were performed under the following conditions, Mn and Mw were measured, and the value of Mw/Mn was calculated. For both Mn and Mw, two measurements were performed and the average value of the two measurements was recorded as Mn and Mw respectively. The value of Mw/Mn was calculated from the determined average values for Mn and Mw.

(Measurement Conditions)

Sample: N,N-dimethylformamide solution of the aromatic polysulfone with a concentration of 0.002 g/mL Sample injection volume: 100 µL Column: Two TSKgel GMHHR-H (7.8 mmø×300 mm) columns, manufactured by Tosoh Corporation, connected in series Column temperature: 40° C.

Eluent: N,N-dimethylformamide

Eluent flow rate: 0.8 mL/minute

Detector: differential refractive index meter (RI)+light scattering photometer (MALS)

Standard reagents: polystyrene

<Measurement of Aromatic Polysulfone Weight Reduction Temperature>

Using the measurement apparatus below, a sample (about 10 mg) of the aromatic polysulfone was combusted by raising the temperature to 800° C. at a rate of temperature increase of 10° C./minute. Using the thus obtained TGA curve, the temperature at which the weight of the sample had reduced by 5% relative to the weight at 200° C. was determined, and that temperature was deemed the 5% weight reduction temperature (° C.), and used as an indicator of the heat resistance of the aromatic polysulfone.

Measurement apparatus: TGA-50 manufactured by Shimadzu Corporation

Production and Evaluation of Aromatic Polysulfones

Example 1

A polymerization tank fitted with a stirrer, a nitrogen inlet tube, a thermometer, and a condenser having a receiver at the tip thereof was charged with bis(4-hydroxyphenyl)sulfone (300.3 g), bis(4-chlorophenyl)sulfone (331.5 g), and diphenyl sulfone (560.9 g) as a polymerization solvent, and the temperature was raised to 180° C. while the inside of the tank was flushed with nitrogen gas. Potassium carbonate (160.1 g) was added to the obtained solution, the temperature was then raised gradually to 290° C., and reaction was allowed to proceed at 290° C. for a further 3 hours. The resulting reaction solution was cooled to room temperature and solidified, and following fine crushing, the product was washed serval times with hot water and washed several times with a mixed solvent of acetone and methanol, and subsequently dried by heating at 150° C., thus obtaining an aromatic polysulfone as a powder. The Mn, Mw, Mw/Mn and 5% weight reduction temperature values for the obtained aromatic polysulfone are shown in Table 1, and the relationship between Mw/Mn and the 5% weight reduction temperature is shown in the FIGURE.

Example 2

A polymerization tank fitted with a stirrer, a nitrogen inlet tube, a thermometer, and a condenser having a receiver at the tip thereof was charged with bis(4-hydroxyphenyl)sulfone (300.3 g), bis(4-chlorophenyl)sulfone (331.5 g), and diphenyl sulfone (560.9 g) as a polymerization solvent, and the temperature was raised to 180° C. while the inside of the tank was flushed with nitrogen gas. Potassium carbonate (160.5 g) was added to the obtained solution, the temperature was then raised gradually to 290° C., and reaction was allowed to proceed at 290° C. for a further 3 hours. The resulting reaction solution was cooled to room temperature and solidified, and following fine crushing, the product was washed serval times with hot water and washed several times with a mixed solvent of acetone and methanol, and subsequently dried by heating at 150° C., thus obtaining an aromatic polysulfone as a powder. The Mn, Mw, Mw/Mn and 5% weight reduction temperature values for the obtained aromatic polysulfone are shown in Table 1, and the relationship between Mw/Mn and the 5% weight reduction temperature is shown in the FIGURE.

Example 3

A polymerization tank fitted with a stirrer, a nitrogen inlet tube, a thermometer, and a condenser having a receiver at the tip thereof was charged with bis(4-hydroxyphenyl)sulfone (300.3 g), bis(4-chlorophenyl)sulfone (323.9 g), and diphenyl sulfone (554.4 g) as a polymerization solvent, and the temperature was raised to 180° C. while the inside of the tank was flushed with nitrogen gas. Potassium carbonate (156.4 g) was added to the obtained solution, the temperature was then raised gradually to 290° C., and reaction was allowed to proceed at 290° C. for a further 3 hours. The resulting reaction solution was cooled to room temperature and solidified, and following fine crushing, the product was washed serval times with hot water and washed several times with a mixed solvent of acetone and methanol, and subsequently dried by heating at 150° C., thus obtaining an aromatic polysulfone as a powder. The Mn, Mw, Mw/Mn and 5% weight reduction temperature values for the obtained aromatic polysulfone are shown in Table 1, and the relationship between Mw/Mn and the 5% weight reduction temperature is shown in the FIGURE.

Example 4

A polymerization tank fitted with a stirrer, a nitrogen inlet tube, a thermometer, and a condenser having a receiver at the tip thereof was charged with bis(4-hydroxyphenyl)sulfone (300.3 g), bis(4-chlorophenyl)sulfone (337.4 g), and diphenyl sulfone (566.0 g) as a polymerization solvent, and the temperature was raised to 180° C. while the inside of the tank was flushed with nitrogen gas. Potassium carbonate (162.9 g) was added to the obtained solution, the temperature was then raised gradually to 290° C., and reaction was allowed to proceed at 290° C. for a further 3 hours. The resulting reaction solution was cooled to room temperature and solidified, and following fine crushing, the product was washed serval times with hot water and washed several times with a mixed solvent of acetone and methanol, and subsequently dried by heating at 150° C., thus obtaining an aromatic polysulfone as a powder. The Mn, Mw, Mw/Mn and 5% weight reduction temperature values for the obtained aromatic polysulfone are shown in Table 1, and the relationship between Mw/Mn and the 5% weight reduction temperature is shown in the FIGURE.

Comparative Example 1

A polymerization tank fitted with a stirrer, a nitrogen inlet tube, a thermometer, and a condenser having a receiver at the tip thereof was charged with bis(4-hydroxyphenyl)sulfone (300.3 g), bis(4-chlorophenyl)sulfone (334.3 g), and diphenyl sulfone (563.3 g) as a polymerization solvent, and the temperature was raised to 180° C. while the inside of the tank was flushed with nitrogen gas. Potassium carbonate (161.4 g) was added to the obtained solution, the temperature was then raised gradually to 305° C., and reaction was allowed to proceed at 305° C. for a further 3 hours. The resulting reaction solution was cooled to room temperature and solidified, and following fine crushing, the product was washed serval times with hot water and washed several times with a mixed solvent of acetone and methanol, and subsequently dried by heating at 150° C., thus obtaining an aromatic polysulfone as a powder. The Mn, Mw, Mw/Mn and 5% weight reduction temperature values for the obtained aromatic polysulfone are shown in Table 1, and the relationship between Mw/Mn and the 5% weight reduction temperature is shown in the FIGURE.

TABLE 1

|  | Mn | Mw | Mw/Mn | 5% weight reduction temperature (° C.) |
| --- | --- | --- | --- | --- |
| Example 1 | 10,000 | 16,220 | 1.62 | 513 |
| Example 2 | 10,500 | 18,300 | 1.74 | 500 |
| Example 3 | 7,700 | 11,600 | 1.51 | 513 |

TABLE 1-continued

|  | Mn | Mw | Mw/Mn | 5% weight reduction temperature (° C.) |
| --- | --- | --- | --- | --- |
| Example 4 | 11,700 | 20,300 | 1.75 | 505 |
| Comparative Example 1 | 9,100 | 17,300 | 1.90 | 496 |

As is evident from Table 1 and the FIGURE, the Mw/Mn value and the 5% weight reduction temperature have a substantially inverse proportional relationship, and although the aromatic polysulfones of Examples 1 to 4 exhibited a high 5% weight reduction temperature and excellent heat resistance, the aromatic polysulfone of Comparative Example 1 had a lower 5% weight reduction temperature and inferior heat resistance.

INDUSTRIAL APPLICABILITY

By using the present invention, a novel aromatic polysulfone having a high 5% weight reduction temperature can be provided, which is extremely useful industrially.

The invention claimed is:

1. An aromatic polysulfone produced by polymerizing a dihalogeno compound represented by general formula (A) shown below, and a dihydric phenol represented by general formula (B) shown below, the aromatic polysulfone having:
   a value (Mw/Mn) for a ratio between a weight average molecular weight (Mw) and a number average molecular weight (Mn) of less than 1.8,
   a number average molecular weight (Mn) of at least 6,000 but less than 14,000, and
   a reduction viscosity of at least 0.22 to 0.36 dL/g:

[Chemical formula 1]

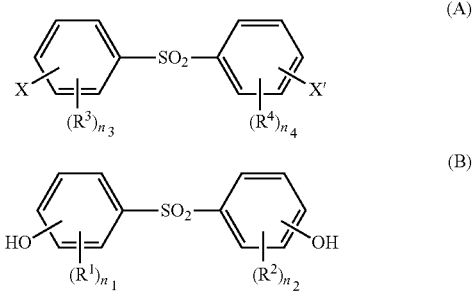

wherein each of X and X' independently represents a halogen atom; each of $R^1$, $R^2$, $R^3$ and $R^4$ independently represents an alkyl group having a carbon number of 1 to 4 or an alkoxy group having a carbon number of 1 to 4; each of $n_1$, $n_2$, $n_3$ and $n_4$ independently represents an integer of 0 to 4; and when $n_1$, $n_2$, $n_3$ or $n_4$ is an integer of 2 to 4, a plurality of $R^1$, $R^2$, $R^3$ or $R^4$ groups may be the same as, or different from, each other.

2. The aromatic polysulfone according to claim 1, wherein a 5% weight reduction temperature of the aromatic polysulfone is at least 498° C.

3. The aromatic polysulfone according to claim 1, wherein the dihalogeno compound is bis(4-chlorophenyl) sulfone and the dihydric phenol is bis(4-hydroxyphenyl) sulfone.

4. The aromatic polysulfone according to claim 1, wherein the number average molecular weight (Mn) is 7,000 to 12,000.

5. The aromatic polysulfone according to claim 2, wherein the 5% weight reduction temperature of the aromatic polysulfone is at least 498° C. but not more than 530° C.

6. The aromatic polysulfone according to claim 1, wherein the value (Mw/Mn) for a ratio between a weight average molecular weight (Mw) and a number average molecular weight (Mn) is 1.5 to 1.79.

* * * * *